(12) United States Patent
Leventhal et al.

(10) Patent No.: US 8,332,351 B2
(45) Date of Patent: Dec. 11, 2012

(54) METHOD AND SYSTEM FOR PRESERVING FILES WITH MULTIPLE LINKS DURING SHADOW MIGRATION

(75) Inventors: Adam H. Leventhal, San Francisco, CA (US); Eric Noah Schrock, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 213 days.

(21) Appl. No.: 12/714,061

(22) Filed: Feb. 26, 2010

(65) Prior Publication Data
US 2011/0213813 A1    Sep. 1, 2011

(51) Int. Cl.
*G06F 7/00* (2006.01)
(52) U.S. Cl. ........................................ 707/610; 707/829
(58) Field of Classification Search .................. 707/640, 707/650, 651, 610, 821, 822, 829
See application file for complete search history.

(56) References Cited

U.S. PATENT DOCUMENTS

| | | | |
|---|---|---|---|
| 6,938,039 | B1 | 8/2005 | Bober et al. |
| 7,917,551 | B2* | 3/2011 | Chikusa et al. ............... 707/821 |
| 2007/0088702 | A1 | 4/2007 | Fridella et al. |
| 2009/0150533 | A1* | 6/2009 | McClanahan et al. ........ 709/223 |
| 2010/0274825 | A1* | 10/2010 | Nemoto et al. ............... 707/812 |
| 2011/0167045 | A1* | 7/2011 | Okamoto ...................... 707/661 |

OTHER PUBLICATIONS

Unionfs.filesystems.org, "ODF: On Disk Format for Unionfs 2.x," http://unionfs.filesystems.org, May 30, 2007, 10 pages.

* cited by examiner

*Primary Examiner* — Amy Ng
(74) *Attorney, Agent, or Firm* — Osha Liang LLP

(57) ABSTRACT

A method for migrating files. The method includes receiving a first file system (FS) operation request for a target FS, making a first determination that migration for a source FS is not complete, and making a second determination that the first FS operation request specifies a directory and that the directory is un-migrated. In response to the first and second determination obtaining meta-data for content in the directory, and creating a directory entry (DE) for a first file in the directory on the target FS. The method further populating the DE for the first file on the target FS using file data, creating a DE for a second file in the directory on the target FS, linking the DE for the second file to the file data and the file level attribute, and servicing, after the linking, the first FS operation request using target FS.

17 Claims, 12 Drawing Sheets

METHOD AND SYSTEM FOR PRESERVING FILES WITH MULTIPLE LINKS DURING SHADOW MIGRATION

BACKGROUND

A typical operating system includes a file system. The file system provides a mechanism for the storage and retrieval of files and a hierarchical directory structure for the naming of multiple files. More specifically, the file system stores information (i.e., data) provided by the client (i.e., a local or remote process) and information describing the characteristics of the data (i.e., meta-data). The file system also provides extensive programming interfaces to enable the creation and deletion of files, reading and writing of files, performing seeks within a file, creating and deleting directories, managing directory contents, etc. In addition, the file system also provides management interfaces to create and delete file systems. File systems are typically controlled and restricted by operating system parameters. For example, most operating systems limit the maximum number of file names that can be handled within their file system. Some operating systems also limit the size of files that can be managed under a file system.

An application, which may reside on the local system (i.e., computer) or may be located on a remote system, uses files as an abstraction to address data. Conventionally, this data is stored on a storage device, such as a disk. To access a file, the operating system (via the file system) typically provides file manipulation interfaces to open, close, read, and write the data within each file.

In some instances, the files need to be migrated from the current file system to a new file system. In such instances, the data (and meta-data) currently stored in the current file system must be moved to a new file system. Such a migration is typically achieved by initially taking the current file system offline (i.e., preventing clients from reading or writing to the current file system). Once offline, various techniques may be used to transfer each directory and file in the current file system to the new file system. Depending on the amount of data in the current file system, the migration may take a significant period of time, during which the data in the current file system and the new file system are inaccessible to the clients.

SUMMARY

In general, in one aspect, the invention relates to a computer readable medium comprising software instructions, which when executed by a processor, perform a method, the method comprising: receiving, from a client, a first file system (FS) operation request for a target FS, making a first determination that migration for a source FS is not complete, making a second determination that the first FS operation request specifies a directory and that a directory level attribute for the directory on the target FS specifies that the directory on the target FS is un-migrated, in response to the first and second determination: obtaining, from the source FS, meta-data for content in the directory, creating, using the meta-data for content in the directory, a directory entry for a first file in the directory on the target FS, obtaining file data for the first file from the source FS, populating the directory entry for the first file on the target FS using the file data, wherein the directory entry for the first file is associated with a file level attribute that specifies the first file is migrated, creating, using the meta-data for content in the directory, a directory entry for a second file in the directory on the target FS, linking the directory entry for the second file to the file data and the file level attribute, and servicing, after the linking, the first FS operation request using target FS.

In general, in one aspect, the invention relates to a computer system, comprising a processor, and a virtual file system layer (VFS) operatively connected to a source file system (FS) and a target FS, wherein the VFS, when executed by the processor, performs a method, the method comprising receiving, from a client, a first file system (FS) operation request for a target FS, making a first determination that migration for a source FS is not complete, making a second determination that the first FS operation request specifies a directory and that a directory level attribute for the directory on the target FS specifies that the directory on the target FS is un-migrated, in response to the first and second determination: obtaining, from the source FS, meta-data for content in the directory, creating, using the meta-data for content in the directory, a directory entry for a first file in the directory on the target FS, obtaining file data for the first file from the source FS, populating the directory entry for the first file on the target FS using the file data, wherein the directory entry for the first file is associated with a file level attribute that specifies the first file is migrated, creating, using the meta-data for content in the directory, a directory entry for a second file in the directory on the target FS, linking the directory entry for the second file to the file data and the file level attribute, and servicing, after the linking, the first FS operation request using target FS.

Other aspects of the invention will be apparent from the following description and the appended claims.

DETAILED DESCRIPTION

Figure 1:
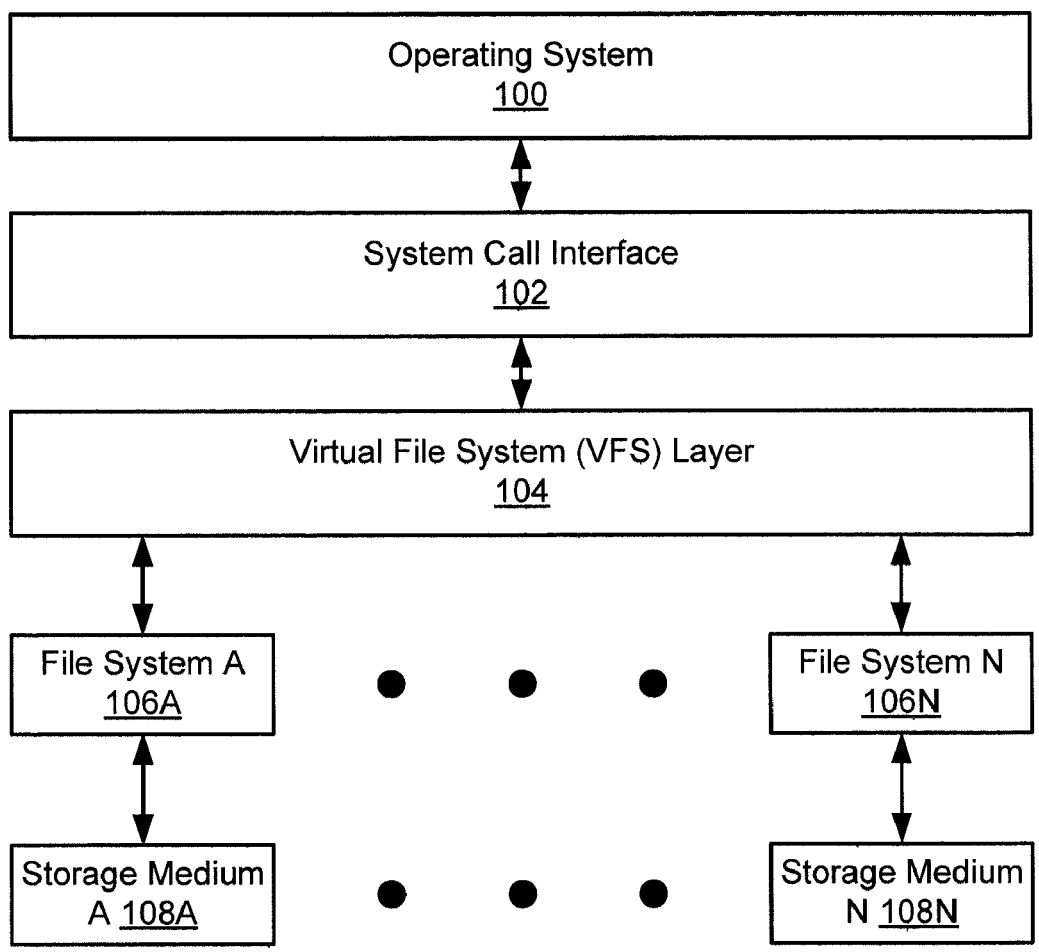
FIG. 1 shows a system in accordance with one embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details.

In general, the invention relates to migration of files and directories from a source file system to a target file system. More specifically, the invention enables file system migration while allowing clients to continue to access the files and directories during the migration. Further, embodiments of the invention provide a method and system for preserving links between directory entries and the corresponding data and metadata (e.g., hard links) during the migration process.

For purposes of this invention, each file system represents directories, sub-directories, and files as directory entries. Each directory entry includes the name of the corresponding entity, i.e., directory, sub-directory, or file, and is associated with the corresponding meta-data and data (if applicable). Accordingly, all references (unless otherwise specified) to directories, sub-directories, and files are intended to include the corresponding directory entry, meta-data, and data (if applicable).

FIG. 1 shows a system in accordance with one embodiment of the invention. The system includes an operating system (100), a system call interface (102), a virtual file system (VFS) (104), a number of file systems (106A, 106N), and a number of storage mediums (108A, 108N). Each of these components is described below.

In one embodiment of the invention, the operating system (100) is configured to interface with clients (not shown) and with the file systems (106A, 106N) via the system call interface (102) and the VFS layer (104). In one embodiment of the invention, a client is any remote or local process (including operating system processes) that includes functionality to issue a file system (FS) operation request. In one embodiment of the invention, FS operation requests include, but are not limited to, read( ), write( ), open( ), close( ), mkdir( ), rmdir( ), rename( ), sync( ), unmount( ), and mount( ). Examples of operating systems (100) include, but are not limited to, MAC OS®, Solaris™, Linux, Microsoft® Windows®. (MAC OS is a registered trademark of Apple, Inc; Microsoft and Windows are registered trademarks of the Microsoft Corporation; Solaris is a trademark of Sun Microsystems, Inc; Linux is a registered trademark on Linus Torvalds.)

In one embodiment of the invention, the system call interface (102) is configured to receive FS operation requests from the operating system (100), forward the FS operation requests to the VFS layer (104), receive responses to the FS operation requests, and forward to the corresponding responses to the operating system. Those skilled in the art will appreciate that while the system call interface (102) is represented as a distinct component from the operating system (100), the system call interface (102) may be located within the operating system (100).

In one embodiment of the invention, the VFS layer (104) is an abstraction layer interposed between file systems (106A, 106N) and the operating system. In one embodiment of the invention, the purpose of the VFS layer (104) is to allow the operating system (100) to access different types of file systems (106A, 106N) in a uniform way. For example, the VFS layer (104) may be used to access local and networked file systems transparently without the operating system (100) being aware of the difference. Further, the VFS layer (104) enables the operating system (100) to access different file systems (e.g., ZFS, Network File System (NFS), Unix File System (UFS), New Technology File System (NTFS), Hierarchical File System (HFS), etc.) without requiring the operating system (100) to be aware of the type of file system it is accessing.

In one embodiment of the invention, each file system (106A, 106N) includes a method for storing and organizing files (including the corresponding file meta-data and file data). Further, each file system (106A, 106N) may include functionality to associate meta-data with directories. The meta-data (associated with directories and files) may include regular attributes and extended attributes.

In one embodiment of the invention, regular attributes are defined and interpreted by the file system, examples of meta-data stored in regular attributes may include but are not limited to access permissions for the file or directory, date/time file was created and/or modified. In one embodiment of the invention, extended attributes may be used to associate meta-data with files and/or directories; however, the meta-data stored in the extended attributes is not defined or interpreted by the file system. In one embodiment of the invention, the root of a target file system (FS) (discussed below), directories in the target FS, and files in the target FS each include at least one extended attribute used to indicate whether the root, directory or file has been migrated. In one embodiment of the invention, the extended attributes are interpreted by the VFS layer (104).

In one embodiment of the invention, each file system (106A, 106N) is configured to store meta-data and data on one or more storage medium (108A, 108N). Each storage medium (108A, 108N) corresponds to a physical storage device configured to store data and meta-data. Examples of the storage mediums (108A, 108N) include, but are not limited to, magnetic media (e.g., disk drives, tape drives), solid-state drives (e.g., NAND flash devices, NOR flash devices), optical media (e.g., compact disks (CDs), digital versatile disks (DVDs), Blu-ray® Disks, etc.), or any combination thereof (Blu-ray is a trademark of the Blu-ray Disk Association).

Those skilled in the art will appreciate that while FIG. 1 shows each file system (106A, 106N) associated with a single storage medium (108A, 108N), a single file system may be associated with multiple storage media and/or a given storage medium may concurrently support multiple file systems.

Figure 2:
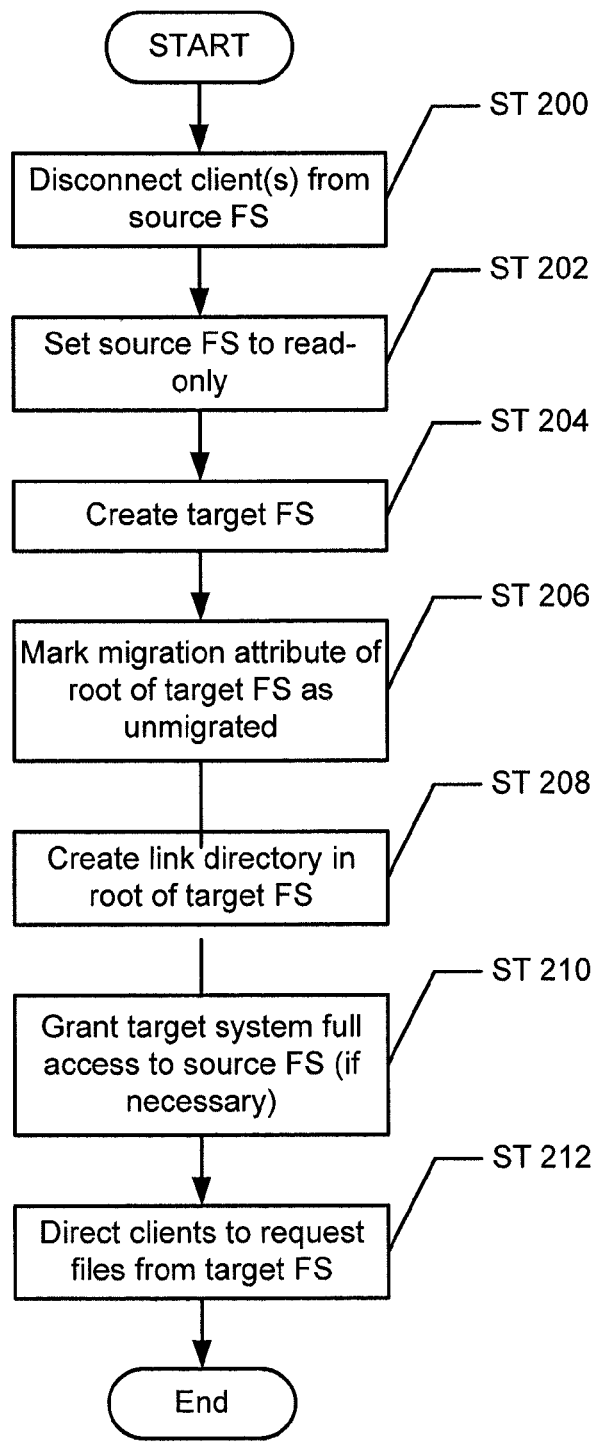
FIG. 2 shows a method in accordance with one embodiment of the invention.
Figure 3A:
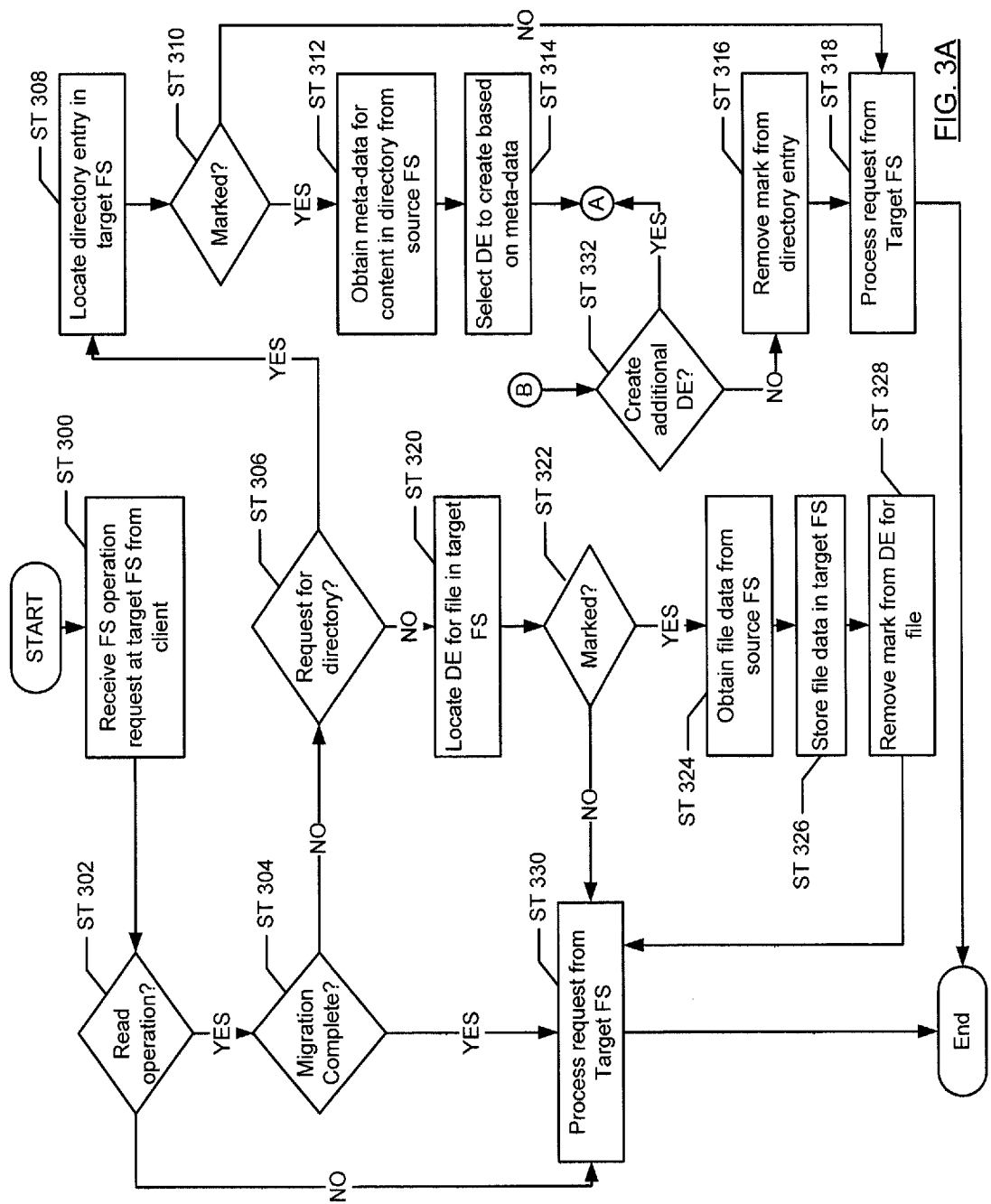
FIGS. 3A and 3B show a method in accordance with one embodiment of the invention.
Figure 3B:
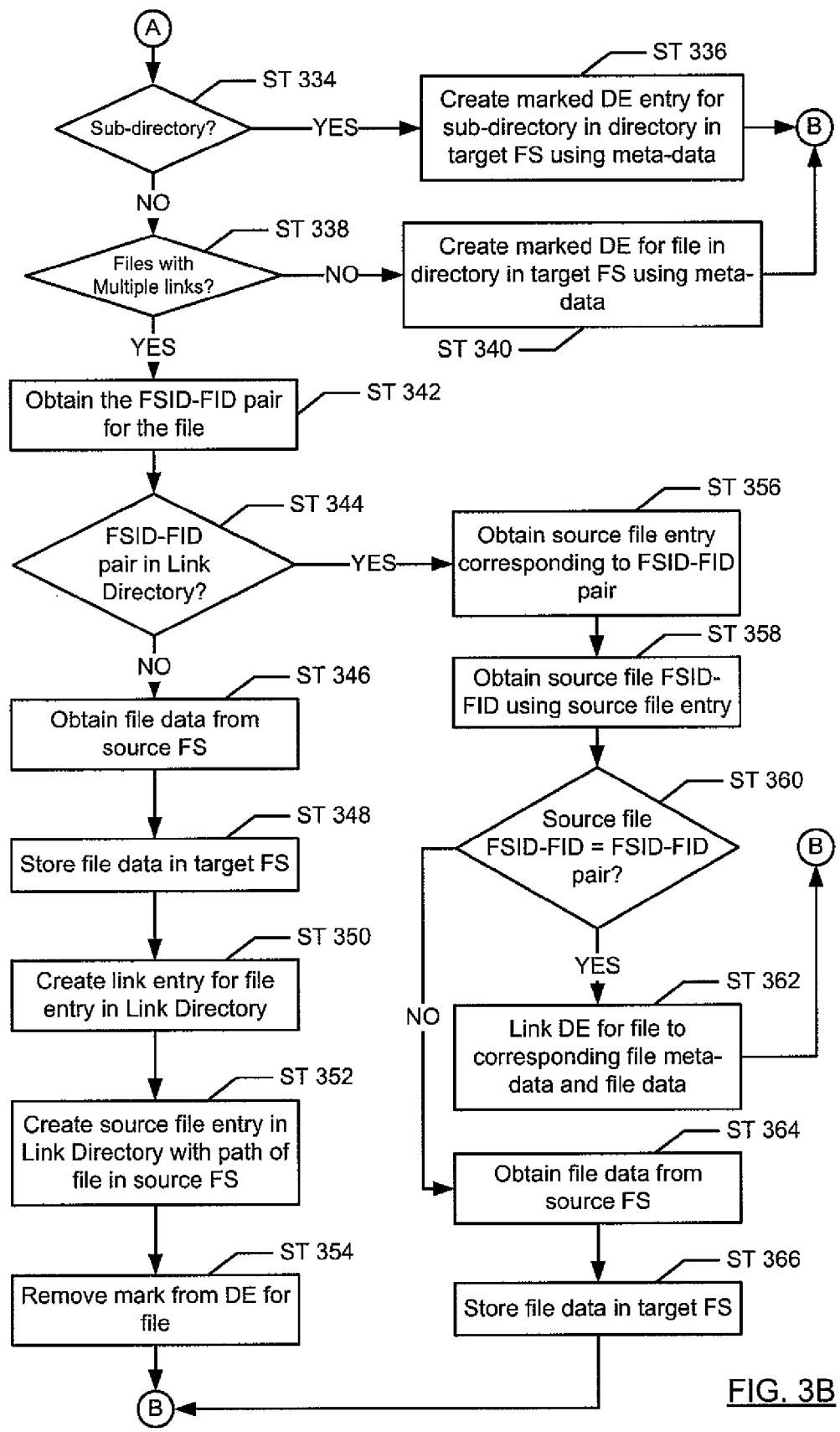

FIGS. 2, 3A, and 3B show methods for migrating data and meta-data from a source FS to a target FS. More specifically, FIG. 2 shows a method for setting up a target FS prior to migrating data and meta-data from the source FS in accordance with one embodiment of the invention. While the various steps in this flowchart are presented and described sequentially, one of ordinary skill will appreciate that some or all of the steps may be executed in different orders, may be combined, or omitted, and some or all of the steps may be executed in parallel. Further, in one or more of the embodiments of the invention, one or more of the steps described below may be omitted, repeated, and/or performed in a different order. In addition, a person of ordinary skill in the art will appreciate that additional steps, omitted in FIG. 2, may be included in performing this method. Accordingly, the specific arrangement of steps shown in FIG. 2 should not be construed as limiting the scope of the invention.

In Step 200, clients are disconnected from the source FS. Those skilled in the art will appreciate that Step 200 may include both disconnecting clients currently accessing the source FS and denying new FS operation requests. In one embodiment of the invention, clients currently awaiting a response from a previously submitted FS operation request are permitted to remain connected to the source FS until the response is received, after which they are disconnected from the source FS.

In Step 202, the source FS is set to read-only. In Step 204, the target FS is created. Those skilled in the art will appreciate that creating the target FS may be performed using any known method(s). Further, once the target FS is created, the target FS may be accessed via the VFS layer. In Step 206, the migration attribute of the root of the target FS is set to "un-migrated." In one embodiment of the invention, the migration attribute is an extended attribute. In Step 208, a link directory is created in the root of the target directory. The link directory is configured to store link entries as discussed in FIG. 3B.

In Step 210, the target system upon which the target FS is located is granted access, optionally, full access, to the source FS. Those skilled in the art will appreciate that the target system may not require full access of the source FS in order to perform the steps in FIGS. 3A and 3B. In such cases, the target system is not granted full access to the source FS. In Step 212, clients previously send FS operation requests to the source FS are redirected to the target FS. Further, after Step 212, new clients are also directed to issue FS operation requests to the target FS.

FIGS. 3A and 3B show a method in accordance with one embodiment of the invention. More specifically, FIGS. 3A and 3B show a method for migrating data and meta-data from a source FS to a target FS in accordance with one embodiment of the invention. While the various steps in this flowchart are presented and described sequentially, one of ordinary skill will appreciate that some or all of the steps may be executed in different orders, may be combined, or omitted, and some or all of the steps may be executed in parallel. Further, in one or more of the embodiments of the invention, one or more of the steps described below may be omitted, repeated, and/or performed in a different order. In addition, a person of ordinary skill in the art will appreciate that additional steps, omitted in FIGS. 3A and 3B, may be included in performing this method. Accordingly, the specific arrangement of steps shown in FIGS. 3A and 3B should not be construed as limiting the scope of the invention.

In Step 300, a FS operation request is received from a client (via the VFS). In Step 302, a determination is made about whether the FS operation is a read operation. If the FS operation is a read operation, the process proceeds to Step 304. If the FS operation is not a read operation (e.g., the operation is a write operation), the process proceeds to Step 330. In one embodiment of the invention, if the FS operation request includes a partial write of file data (i.e., one portion of the file data is to be overwritten), then the corresponding directory entry (including file metadata and file data) is migrated (see, e.g., ST 324-ST328) prior to proceeding to Step 330.

In Step 304, a determination is made about whether the migration of the source FS is complete. The migration of the source FS is complete when all data and meta-data from the source FS has been copied (or otherwise transmitted) to the target FS. If the migration is not complete, the process proceeds to Step 306. If the migration is complete, the process proceeds to Step 330.

In Step 306, a determination is made about whether the FS operation request is a read request for a directory. If the FS operation request is a read request for a directory, then the process proceeds to Step 308. If the FS operation request is not a read request for a directory (i.e., the FS operation request is for a file), then the process proceeds to Step 320. In Step 308, the directory entry corresponding the requested directory in the target FS is located. In one embodiment of the invention, the directory entry includes at least meta-data associated with the directory and a migration attribute (which may be marked or unmarked, depending on whether the directory has been migrated).

In Step 310, a determination is made about whether the migration attribute in the directory entry is marked (i.e., has the directory been migrated). If the migration attribute is marked, then the directory has not been migrated and the process proceeds to Step 312. If the migration attribute is un-marked, then the directory has been migrated and the process proceeds to Step 318. In one embodiment of the invention, a directory is considered migrated when there is a corresponding directory entry for each file and sub-directory (with the associated meta-data) in the directory on the target FS for each file and sub-directory in the corresponding directory on the source FS. Those skilled in the art will appreciate that the directory entries for the files in the directory on the target FS do not need to include corresponding file data in order for the directory to be deemed as migrated.

In Step 312, the meta-data for content in the directory (e.g., file meta-data and/or sub-directory meta-data) is obtained from the source FS.

In Step 314, a directory entry to create in the directory on the target FS is selected based on the meta-data obtained in Step 312. The process then proceeds to FIG. 3B, which is described below.

After completing the processing described in FIG. 3B, the process proceed to Step 316. In Step 316, the migration attribute for the directory entry is unmarked. In Step 318, the FS operation request is processed using the target FS.

In Step 320, the directory entry (DE) for the file corresponding to the requested file in the target FS is located. In one embodiment of the invention, the directory entry for the file includes at least meta-data associated with the file and a migration attribute (which may be marked or unmarked, depending on whether the file has been migrated).

In Step 322, a determination is made about whether the migration attribute in the directory entry for the file is marked (i.e., has the file been migrated). If the migration attribute is marked, then the file has not been migrated and the process proceeds to Step 324. If the migration attribute is un-marked, then the file has been migrated and the process proceeds to Step 330. In one embodiment of the invention, a file is considered migrated when the file data for the file has been obtained from the source FS. In Step 324, the file data for the file is obtained from the source FS. In one embodiment of the invention, the file data is obtained using the path stored in the extended attribute for the corresponding directory entry for the file. In Step 326, the file data is stored in the target FS. In Step 328, the migration attribute for the DE for the file is unmarked. In Step 330, the FS operation request is processed using the target FS.

Referring to FIG. 3B, in Step 334 a determination is made about whether the DE to create, selected in Step 314, corresponds to a sub-directory. If the DE to be created corresponds to a sub-directory, then the process proceeds to Step 336; otherwise, the process proceeds to Step 338.

In Step 336, a marked DE for the sub-directory is created within the directory on the target FS using the meta-data obtained in Step 312. The process then proceeds to Step 332 in FIG. 3A (described below). In one embodiment of the invention, a marked directory entry corresponds to a directory entry for a sub-directory with a marked migration attribute. Further, in one embodiment of the invention, the path to the sub-directory identified in the meta-data obtain in Step 312 is stored in an extended attribute for the corresponding directory entry.

In Step 338, a determination is made about whether the DE to create, selected in Step 314, corresponds to a file with multiple links (i.e., the file data and file meta-data associated with the selected DE is also associated with at least one other DE; see FIGS. 5A-5F below for an example). For example, consider the scenario in which two DEs named, file X and file Y, respectively, directly reference (e.g., using a pointer) the same underlying file data and file meta-data. Accordingly, file X is considered to have multiple links and file Y is considered to have multiple links. If the DE to be created corresponds to a file with multiple links, then the process proceeds to Step 342; otherwise, the process proceeds to Step 340.

In Step 340, a marked DE for the file (without multiple links) is created within the directory on the target FS using the meta-data obtained in Step 312. The process then proceeds to Step 332 in FIG. 3A (described below). In one embodiment of the invention, a marked directory entry corresponds to a directory entry for a file with a marked migration attribute. Further, in one embodiment of the invention, the path to the file identified in the meta-data obtain in Step 312 is stored in an extended attribute for the corresponding directory entry.

In Step 342, the FS Identification (FSID)-File Identification (FID) pair for the file is obtained using the meta-data discussed in Step 312. In one embodiment of the invention, the FSID is a unique identifier of the source FS and the FID is a unique identifier (within the scope of the source FS) of the DE (with which the file is associated) in the source FS. In one embodiment of the invention, the FSID-FID pair is obtained/generated based on the meta-data obtained in Step 312. In one embodiment of the invention, the meta-data used to generated the FSID-FID pair is obtained using the stat( ), statvfs( ), or other equivalent file system methods. In one embodiment of the invention, the stat( ) method returns the following information (note the method may return other information not listed): (i) the inode number and (ii) the number of hard links. In one embodiment of the invention, the inode number is a unique number associated with each filename and is used to look up an entry in the inode table which gives information on the type, size, and location of the file and the userid of the owner of the file.

In Step 344, a determination is made about whether the FSID-FID pair is presented in the Link Directory, which is located in the target FS. If the FSID-FID pair is present in the Link Directory, then the file data and file meta-data corresponding to the FID have been previously migrated (though the file data or file meta-data may have changed since the migration) and the process proceeds to Step 356; otherwise, the process proceeds to Step 346. In Step 346, the file data for the file is obtained from the source FS. In one embodiment of the invention, the file data is obtained using the path stored in the extended attribute for the corresponding directory entry for the file. Those skilled in the art will appreciate that the directory entry for the file may be created at anytime prior to storing the file data in the target FS. Further, the directory entry for the file is initially associated with a migration attribute, which is by default, set as "marked."

In Step 348, the file data is stored in the target FS. In Step 350, a link entry for the file (i.e., file data and file meta-data) is created in the Link Directory. In one embodiment of the invention the link entry includes the FSID-FID pair and a link. In one embodiment of the invention, the link is a direct reference (e.g., a pointer) to the file data and file meta-data. In Step 352, a source file entry for the file is created in the Link Directory. The source file entry includes the FSID-FID pair and a path to the file on the source FS. In Step 354, the migration attribute for the DE for the file is set to "unmarked." The process then proceeds to Step 332 in FIG. 3A.

In Step 356, the source file entry corresponding to the FSID-FID pair is obtained from the Link Directory. In Step 358, the FSID-FID pair for the corresponding file on the source FS is obtained using the path in the source FS. In one embodiment of the invention, the path from the source file entry is used as in input into a stat( ), statvfs ( ), or other equivalent method in order to obtain the FSID-FID pair for the corresponding file on the source FS. In Step 360, a determination is made about whether the FSID-FID pair from Step 342 is the same as the source file FSID-FID pair obtained in Step 358. If the underlying file data and file meta-data has not changed from the time the FSID-FID entry was created in the Link Directory to the time the source file FSID-FID was obtained, then the FSID-FID pair from Step 342 is the same as the source file FSID-FID pair obtained in Step 358 and the process proceeds to Step 362; otherwise the process proceeds to Step 364. In Step 362, because the underlying file data and meta-data has not changed, there is no need to migrate the file data and meta-data from the source FS. Instead, a link is created from the DE for the file (which is created at some point after Step 314 and prior to Step 362) to the corresponding file data and meta-data. In one embodiment of the invention, the DE for the file is initially created as marked. Once the link from the DE to the file data and meta-data is created, the migration attribute is set to "unmarked". The process then proceeds to Step 332 in FIG. 3A.

In Step 364, because the underlying file data and meta-data has changed, the file data and meta-data must be migrated from the source FS. Accordingly, the file data for the file is obtained from the source FS. In one embodiment of the invention, the file data is obtained using the path stored in the extended attribute for the corresponding directory entry for the file. In Step 366, the file data is stored in the target FS. The process then proceeds to Step 332 in FIG. 3A.

Referring to FIG. 3A, in Step 332, a determination is made about whether there are additional directory entries to create. If there are additional directory entries to create, the process proceeds to Step 334; otherwise the process proceeds to Step 316.

In one embodiment of the invention, FIGS. 3A and 3B show a method for servicing synchronous FS operation requests (i.e., FS operation requests from clients). In one embodiment of the invention, the method shown in FIGS. 3A and 3B may be performed (for example concurrently) by background processes in order to migrate directory entries from the source FS to the target FS. For example, one or more background processes may include functionality to traverse the source FS and migrate all un-migrated file encountered during the traversal in accordance with one or more embodiments discussed above. In one embodiment, the background processes may be associated with a lower processing priority than processes used to service synchronous FS operation requests.

In another embodiment of the invention, the method shown in FIGS. 3A and 3B may be performed concurrently with a background migration process(es). In particular, the background process migrates each directory and/or file encountered (i.e., copies meta-data and data (if applicable) for the directory and/or file at the time it is encountered). In such cases, two separate migration processes are used to migrate the files and directories to from the source FS to the target FS, namely the method shown in FIGS. 3A and 3B and the background process(es).

The following examples are provided to illustrate various aspects of the invention and are not intended to limit the scope of the invention.

Figure 4:
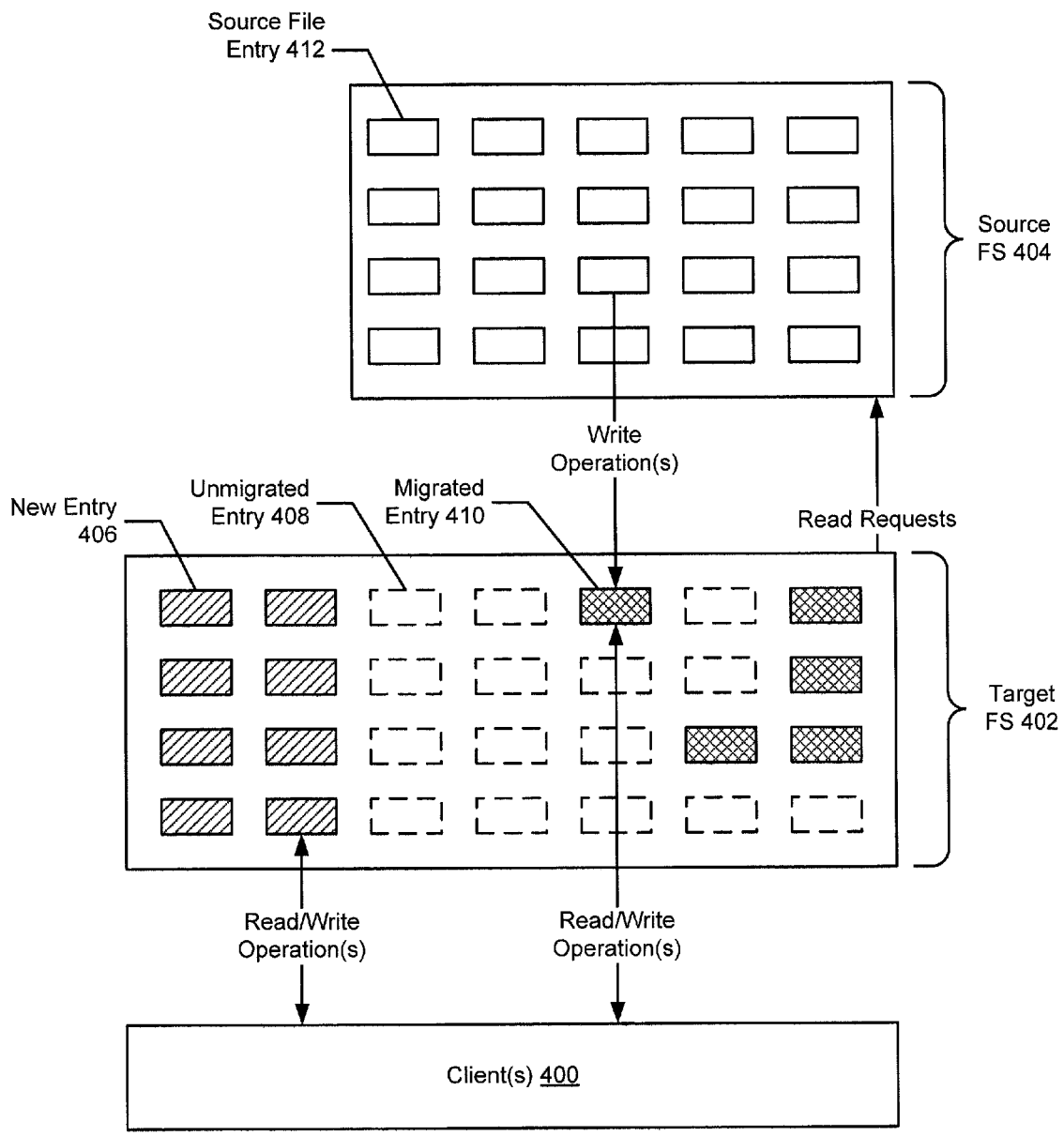
FIG. 4 shows an example system in accordance with one embodiment of the invention.

FIG. 4 shows an example system in accordance with one embodiment of the invention. More specifically, FIG. 4 shows the interaction between client(s) 400, the target FS (402), and the source FS (404).

In one embodiment of the invention, the client(s) (400) cease to send FS operation requests to the source FS (404) and instead re-direct (or re-issue) all FS operation requests to the target FS (402). The client(s) (400) are unaware that the target FS (402) may not (at the time of the FS operation request) include a copy of the file, which is the target of the FS operation request.

As shown in FIG. 4, the client(s) may perform read/write operations on new entries (406) (i.e., directory entries for files and, sub-directories, or directories that are initially created on the target FS (402) and, as such, were never present on the source FS (404)). Further, the clients may perform read/write operations on unmigrated directory entries (e.g., 408) and migrated directory entries (e.g., 410). With respect to unmigrated directory entries, the target FS (402) must perform the appropriate steps (see FIG. 3) in order to migrate the corresponding source directory entry (e.g., 412) from the source FS (404) to the target FS (402) prior to serving the FS operation request from the client(s) (400).

With respect to migrated directory entries, once the directory entries have been migrated, the client(s) (400) interact with the migrated directory entries in the same manner as the client(s) (400) interact with the new directory entries.

Figure 5A:
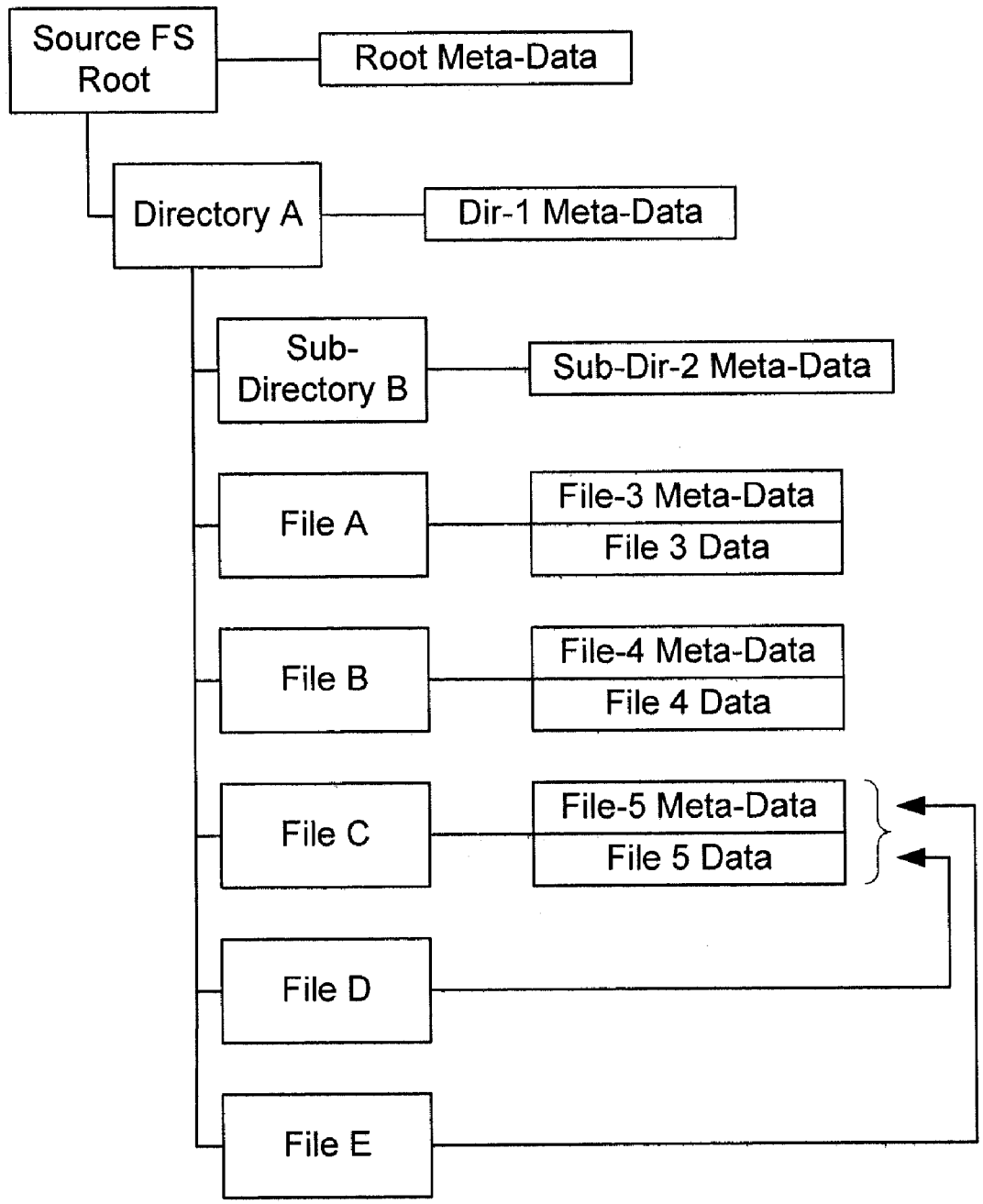
FIG. 5A-5F shows an example in accordance with one embodiment of the invention.

FIGS. 5A-5F show an example in accordance with one embodiment of the invention. More specifically, FIG. 5A shows a source FS and FIG. 5B-5F show an exemplary migration of the source FS to a target FS in accordance with one or more embodiments of the invention.

Referring to FIG. 5A, the source FS includes a source FS root (i.e., the entry point in to the source FS). The source FS further includes a directory entry for Directory A. The directory entry for Directory A further includes directories entries for Sub-Directory B, File A, File B, File C, File D, and File E. Each of the source FS root, Directory A, and Sub-Directory B includes corresponding meta-data. In addition, each of the aforementioned files includes file meta-data and file data. However, the file-data and meta-data for Files C, D, and E are shared; accordingly, each of Files C, D, and E are considered as having multiple links. Further, while not shown, assume for purposes of this example that Sub-Directory B includes additional directory entries for additional files.

Figure 5B:
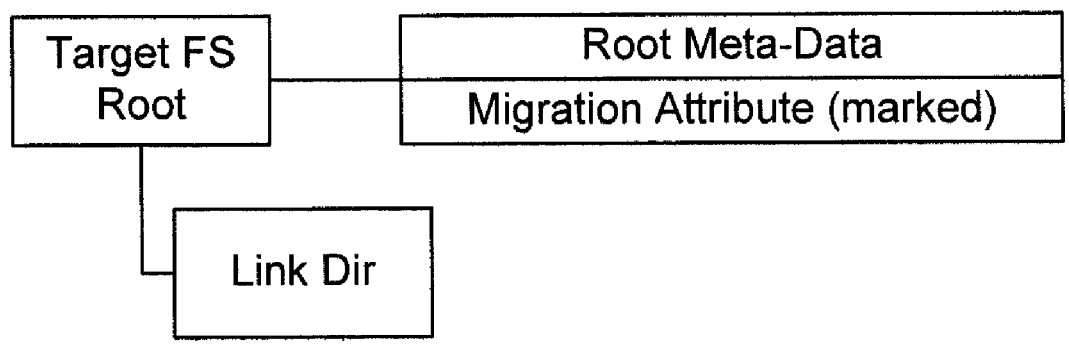

FIG. 5B shows the target FS after the steps in FIG. 2 have been performed. Specifically, once the Steps in FIG. 2 have been performed, the target FS includes a target FS root, which is associated with root meta-data as well as a migration attribute. As shown in FIG. 5B, the migration attribute is set as "marked", which indicates the target FS root has not been migrated. Further, a Link Directory (Link Dir) is also created within the target FS.

Figure 5C:
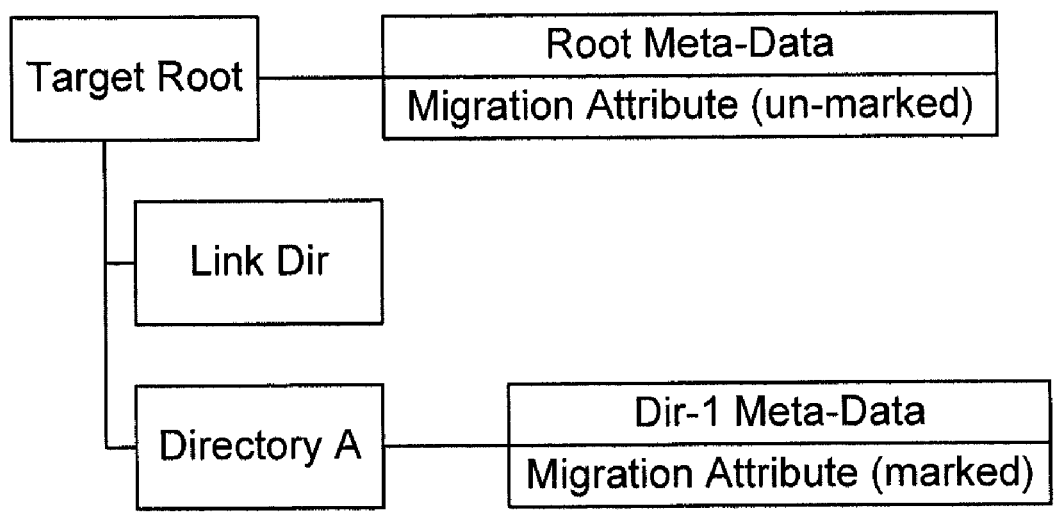

FIG. 5C shows the target FS after a read request for the target FS root is serviced by the target FS. In response to the request, Steps 302, 304, 306, 308, 310, 312, 314, 334, 316, 318, and 330 are performed. The result of performing the aforementioned steps is the updating of the migration attribute associated with the target FS root to "un-marked," which indicates that the target FS root has been migrated. Further, a directory entry for Directory A is created in the target FS. The directory entry for Directory A is associated with corresponding meta-data (i.e., Dir-1-Meta-Data) obtained from the source FS, and with a migration attribute. As shown in FIG. 5C, the migration attribute is set as "marked," which indicates Directory A has not been migrated.

Figure 5D:
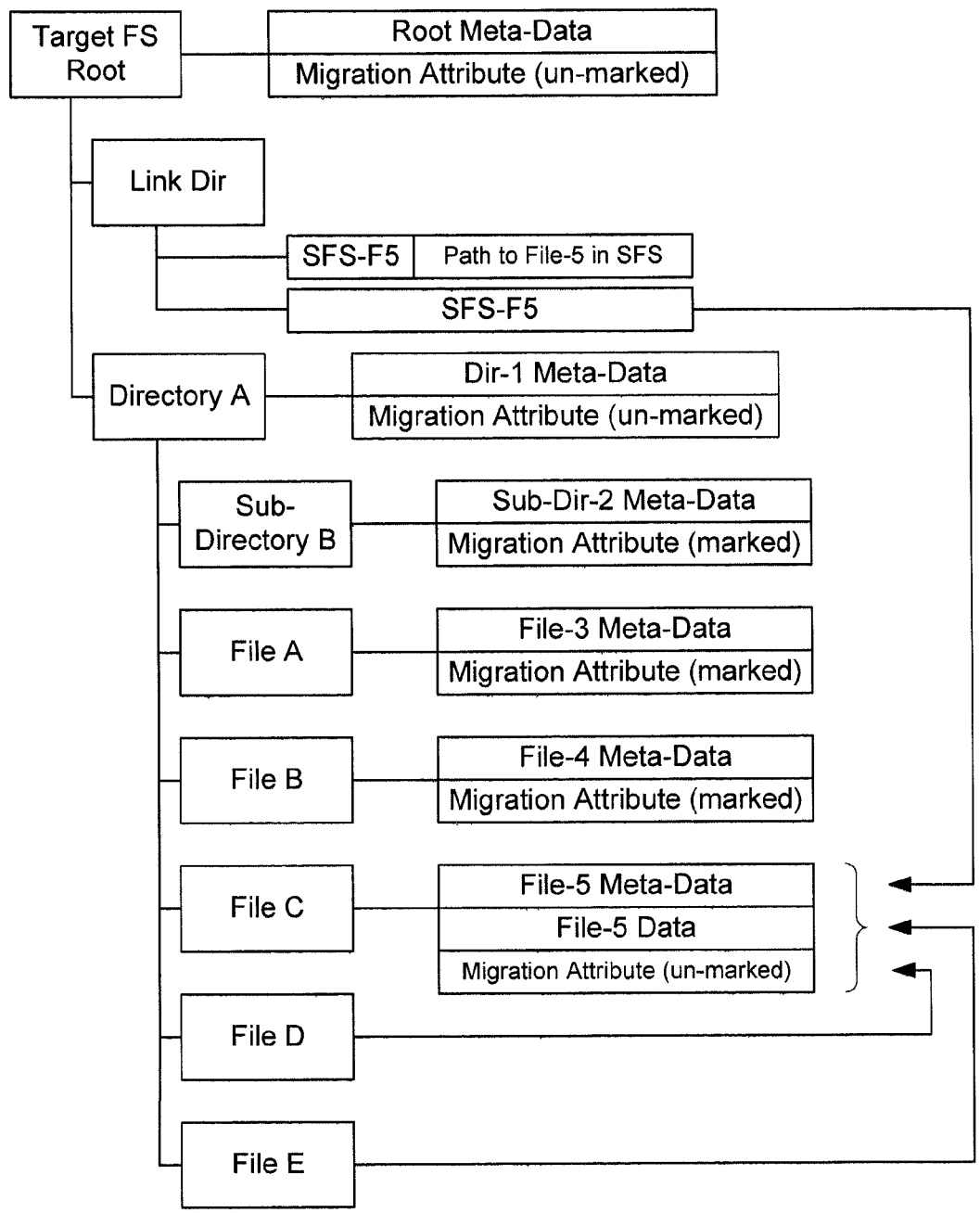

FIG. 5D shows the target FS after a read request for Directory A is serviced by the target FS. In response to the request, Steps 302, 304, 306, 308, 310, 312, 314, 334, and 336 are performed to create a directory entry for Sub-Directory B. Further, Steps 338 and 340 are performed to create a directory entry for File A and Steps 338 and 340 are performed to create a directory entry for File B. In addition, Steps 334, 338, 342, 344, 346, 348, 350, 352, and 354 are preformed to create a directory entry for File C (as well as migrate the file data and meta-data associated with File C). Finally, Steps 334, 338, 342, 344, 356, 358, 360, 362 are performed twice—once to create a directory entry for File D and a second time to create a directory entry for File E. Once the aforementioned directory entries are created and the file data and file meta-data associated with file C has been migrated, Steps 316, 318, and 330 are performed.

The result of performing the aforementioned steps is the updating of the migration attribute associated with Directory A to "un-marked," which indicates that Directory A has been migrated. Further, directory entries for Sub-Directory B, File A, and File B are created on the target FS. The directory entry for Sub-Directory B is associated with corresponding meta-data (i.e., Sub-Dir-2-Meta-Data) obtained from the source FS and with a migration attribute. As shown in FIG. 5D, the migration attribute is set as "marked", which indicates that Sub-Directory B has not been migrated. Further, the directory entries for File A and File B are associated with corresponding meta-data (i.e., File-3-Meta-Data and File-4-Meta-Data) obtained from the source FS, and with corresponding migration attributes. As shown in FIG. 5D, the migration attributes for Files A and B are set as "marked", which indicates Files A and B have not been migrated.

Further, the Files C, D, and E are migrated. The result of the migration is a single copy of the file data and meta-data for Files C, D, and E. Further, the Link directory includes (i) a link entry indexed with the FSID-FID pair for the file data and meta-data (i.e., SFS-F5) along with a link to the file data and meta-data (i.e., File-5 Meta-Data and File-5 Data) and (ii) a source file entry indexed with the FSID-FID pair for the file data and meta-data (i.e., SFS-F5) along with a listing of the path to the file data (and associated file meta-data) in the source FS (SFS). Finally, the associated migration attribute (i.e., the migration attribute associated with Files C, D, and E) is set to "un-marked," which indicates that Files C, D, and E have been migrated.

Those skilled in the art will appreciate that in the above example, the underlying file data and meta-data in the source FS did not change during the creation of directory entries for Files D and E. As such, Steps 364 and 366 were not performed. However, had there been a change in the underlying file data or meta-data, Steps 362 and 364 would have been performed for one or both of Files D and E.

Figure 5E:
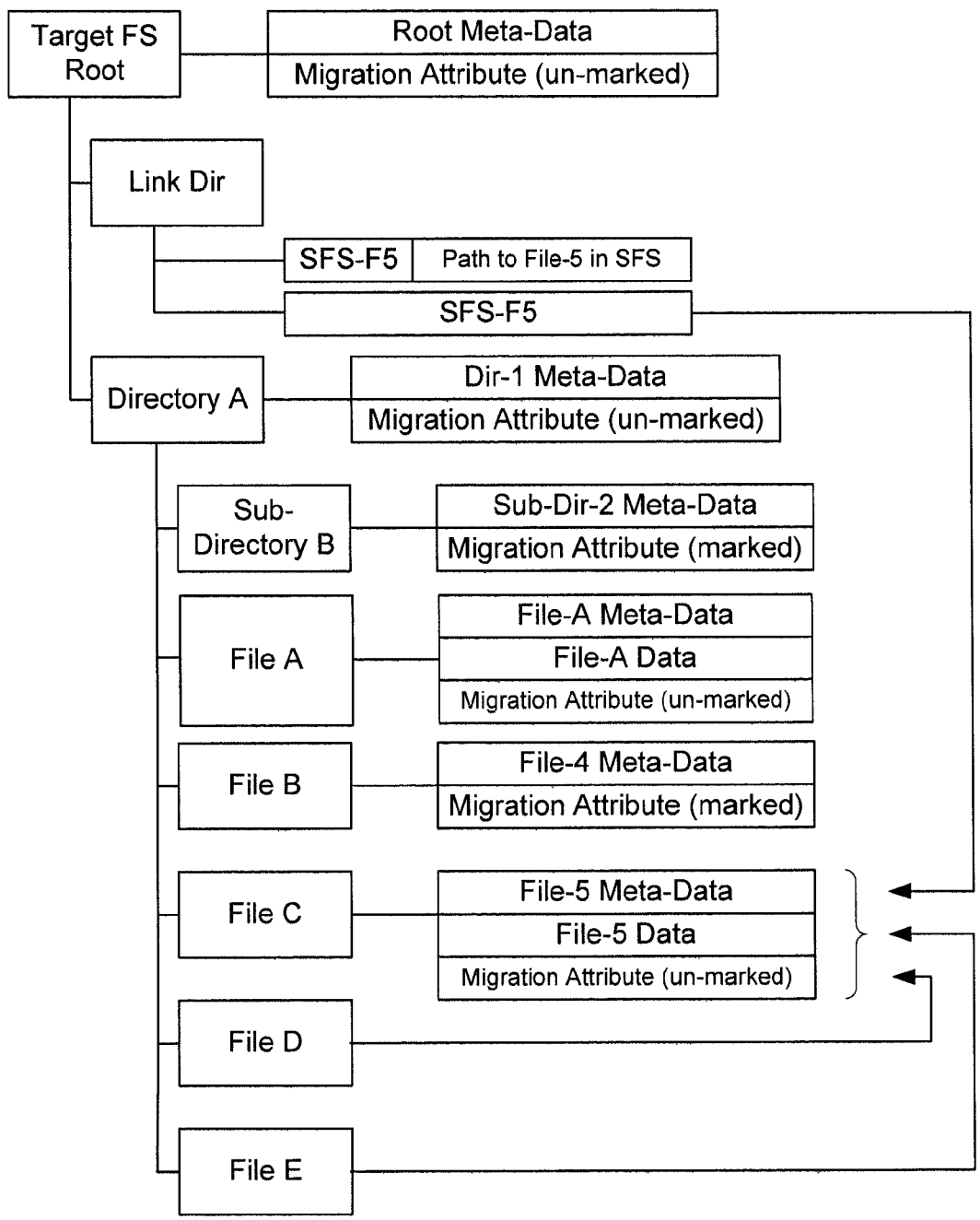

FIG. 5E shows the target FS after a read request for File A is serviced by the target FS. In response to the request, Steps 302, 304, 306, 320, 322, 324, 326, 328, and 330 are performed. The result of performing the aforementioned steps is storage of the file data for File A (i.e., File 1 Data) on the target FS and the updating of the migration attribute associated with File A to "un-marked", which indicates that File A has been migrated.

Figure 5F:
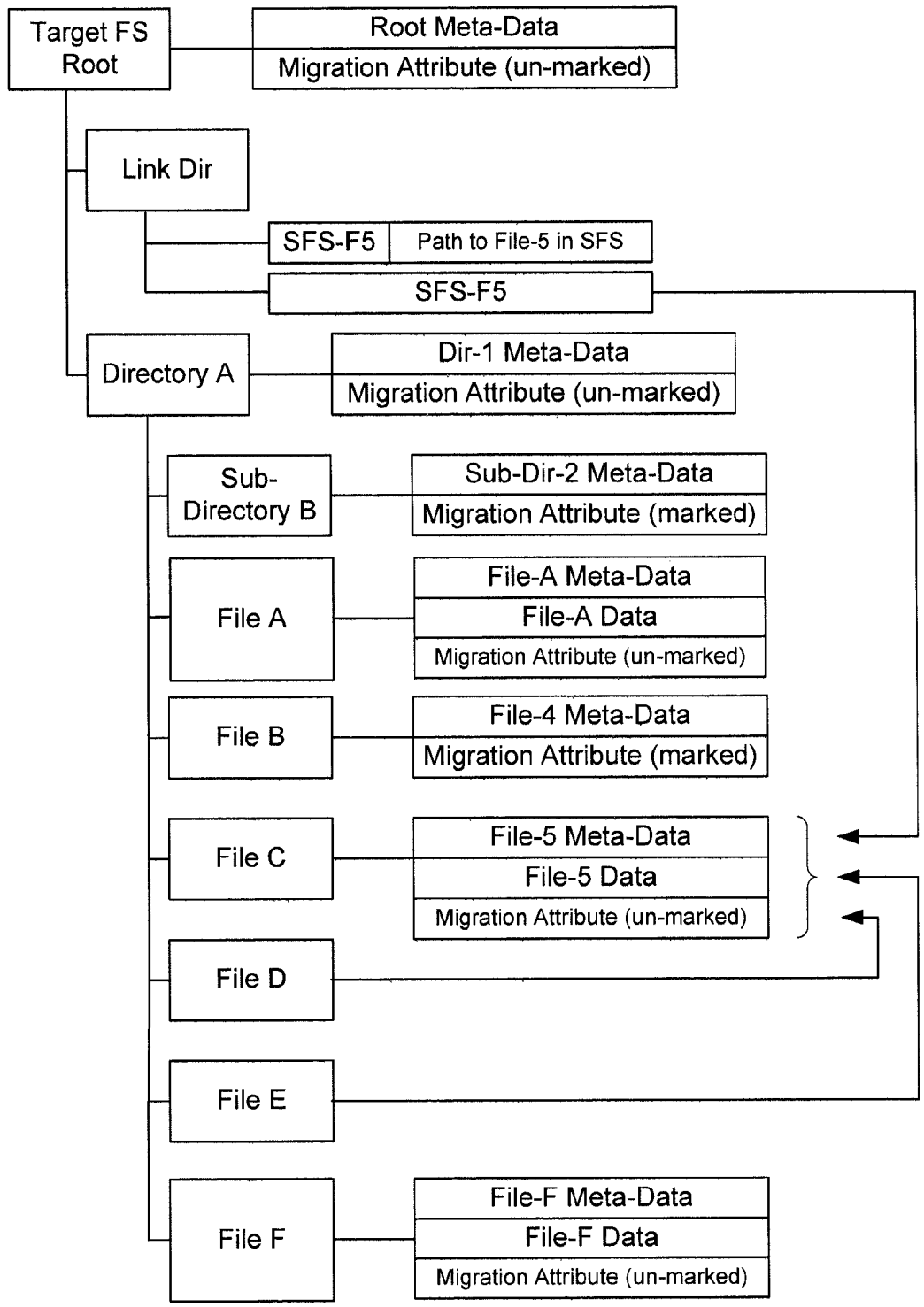
Figure 6:
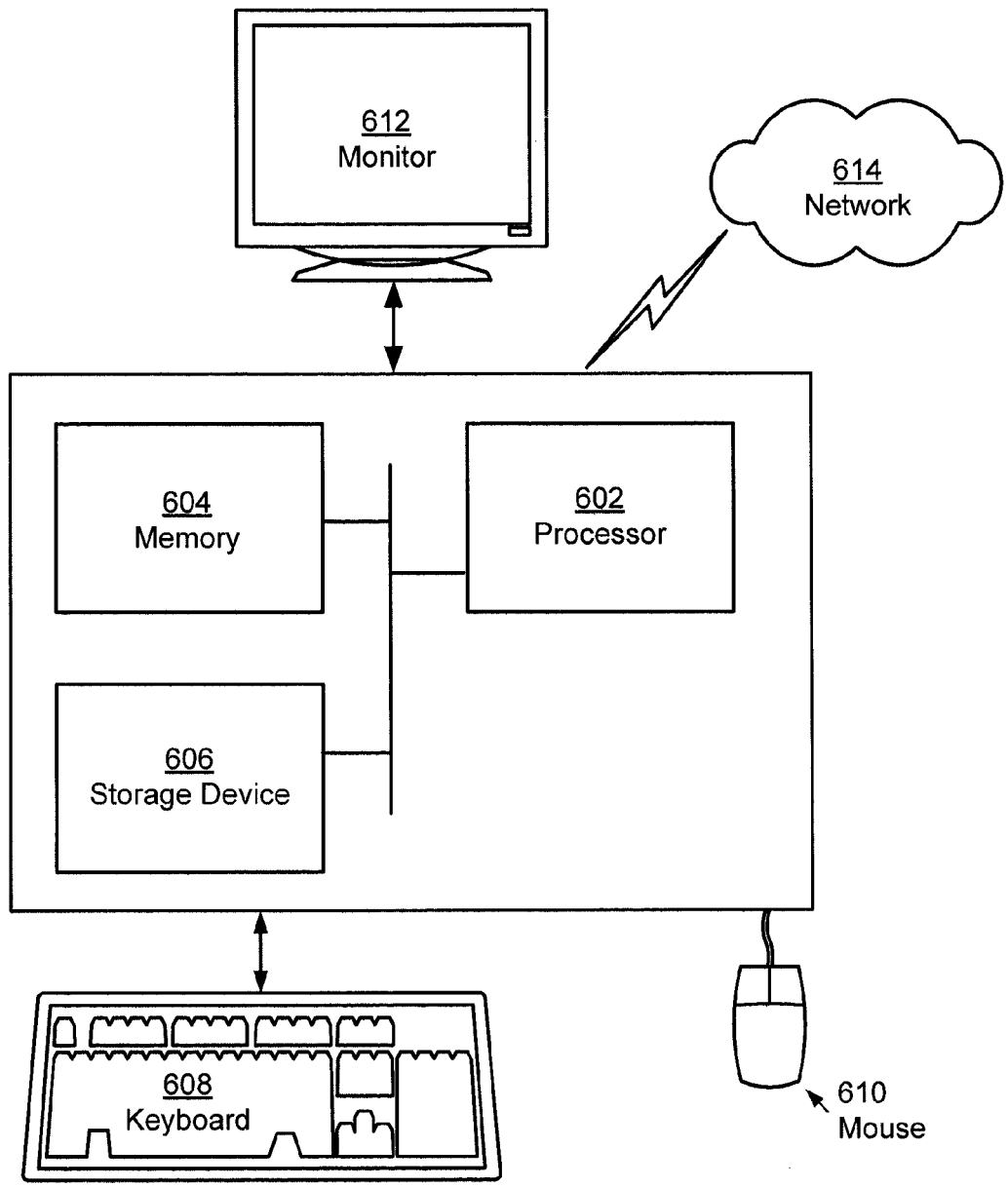
FIG. 6 shows a computer system in accordance with one embodiment of the invention.

FIG. 5F shows the target FS after a full write request for File F is serviced by the target FS. In response to the request, Steps 302 and 330 are performed. The result of performing the aforementioned steps is creation of a directory entry for File F, which includes meta-data, file data, and a migration attribute. The migration attribute for File F is set as unmarked, which indicates that File F has been migrated. Those skilled in the art will appreciate that the state of the target FS shown in FIG. 5F, may be the result of writing a new directory entry to the target FS (i.e., File F was not previously present on the source FS) or the result of a partial write request (i.e., File F was migrated from the source FS and then a portion of the file data (or meta-data) associated with File F was overwritten).

Embodiments of the invention may be implemented on virtually any type of computer regardless of the platform being used. For example, as shown in FIG. 4, a computer system (600) includes one or more processor(s) (602), associated memory (604) (e.g., random access memory (RAM), cache memory, flash memory, etc.), a storage device (606) (e.g., a hard disk, an optical drive such as a compact disk drive or digital video disk (DVD) drive, a flash memory stick, etc.), and numerous other elements and functionalities typical of today's computers (not shown). In one or more embodiments of the invention, the processor (602) is hardware. For example, the processor may be an integrated circuit. The computer system (600) may also include input means, such as a keyboard (608), a mouse (610), or a microphone (not shown).

Further, the computer system (600) may include output means, such as a monitor (612) (e.g., a liquid crystal display (LCD), a plasma display, or cathode ray tube (CRT) monitor). The computer system (600) may be connected to a network (614) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (600) includes at least the minimal processing, input, and/or output means necessary to practice embodiments of the invention.

Further, those skilled in the art will appreciate that one or more elements of the aforementioned computer system (600) may be located at a remote location and connected to the other elements over a network. Further, embodiments of the invention may be implemented on a distributed system having a plurality of nodes, where each portion of the invention (e.g., storage devices, operating system, etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions to perform embodiments of the invention may be stored, temporarily or permanently, on a computer readable medium, such as a compact disc (CD), a diskette, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising software instructions, which when executed by a processor, perform a method, the method comprising:
   receiving, from a client, a first file system (FS) operation request for a target FS;
   making a first determination that migration for a source FS is not complete;
   making a second determination that the first FS operation request specifies a directory and that a directory level attribute for the directory on the target FS specifies that the directory on the target FS is un-migrated;
   in response to the first and second determination:
      obtaining, from the source FS, meta-data for content in the directory;
      creating, using the meta-data for content in the directory, a directory entry for a first file in the directory on the target FS,
      obtaining file data for the first file from the source FS;
      populating the directory entry for the first file on the target FS using the file data, wherein the directory entry for the first file is associated with a file level attribute that specifies the first file is migrated;
      creating, using the meta-data for content in the directory, a directory entry for a second file in the directory on the target FS;
      linking the directory entry for the second file to the file data and the file level attribute;
      servicing, after the linking, the first FS operation request using target FS;
   obtaining, using the meta-data for content in the directory, a first file system identification (FSID)—file identification (FID) pair for a third file;
   locating, using the first FSID-FID pair, a source file entry in a link directory, wherein the link directory is located in the target FS;
   obtaining a path to the third file on the source FS from the source file entry;
   obtaining, using the path, a second FSID-FID pair for the third file;
   making a third determination that the first FSID-FID pair is not equal to the second FSID-FID pair;
   in response to the third determination:
      obtaining file data for the third file from the source FS;
      populating a directory entry for the third file on the target FS using the file data for the third file; and
      updating, after the populating the directory entry for the third file, a file level attribute for the third file to indicate that the third file on the target FS is migrated.

2. The non-transitory computer readable medium of claim 1, wherein the method further comprises:
   creating a link entry in the target FS, wherein the link entry comprises a file system identification (FSID) for the source FS, a file identification (FID) for the first file, and a link from the link entry to the file data.

3. The non-transitory computer readable medium of claim 1, wherein the method further comprises:
   creating a source file entry in the target FS, wherein the source file entry comprises a file system identification (FSID) for the source FS, a file identification (FID) for the first file, and a path of the first file on the source FS.

4. The non-transitory computer readable medium of claim 1, wherein the method further comprises:
   prior to receiving the first FS operation request for the target FS:
      disconnecting the client from the source FS;
      setting the source FS to read-only;
      creating the target FS;
      granting a target system comprising the target FS access to the source FS; and
      directing the client to issue the first FS operation request to the target FS.

5. The non-transitory computer readable medium of claim 1, wherein the method further comprises:
   receiving a second file system (FS) operation request for the target FS from the client;
   making a fourth determination that migration for the source FS is not complete;
   making a fifth determination that the second FS operation request specifies a third file and that a file level attribute for the third file in the directory on the target FS specifies that the third file on the target FS is un-migrated;
   in response to the fourth and fifth determination:
      obtaining file data for the third file from the source FS;
      populating a directory entry for the third file on the target FS using the file data for the third file; and
      servicing, after the populating, the second FS operation request using target FS.

6. The non-transitory computer readable medium of claim 5, wherein the method further comprises:
   updating, after the populating the directory entry for the third file, the file level attribute for the third file to indicate that the third file on the target FS is migrated.

7. The non-transitory computer readable medium of claim 6, wherein the method further comprises:
   receiving a third file system (FS) operation request for the target FS from the client;
   making a sixth determination that migration for the source FS is not complete;
   making a seventh determination that the third FS operation request specifies the third file and that the file level attribute for the third file on the target FS specifies that the third file on the target FS is migrated;
   in response to the sixth and seventh determination:
      servicing the third FS operation request using target FS.

8. The non-transitory computer readable medium of claim 5, wherein the second FS operation request is a read request.

9. The non-transitory computer readable medium of claim 1, wherein the file level attribute is implemented as an extended attribute of the target FS.

10. A computer system, comprising:
   a processor; and
   a virtual file system layer (VFS) operatively connected to a source file system (FS) and a target FS;
   wherein the VFS, when executed by the processor, performs a method, the method comprising:
      receiving, from a client, a first file system (FS) operation request for a target FS;
      making a first determination that migration for a source FS is not complete;
      making a second determination that the first FS operation request specifies a directory and that a directory level attribute for the directory on the target FS specifies that the directory on the target FS is un-migrated;
      in response to the first and second determination:
         obtaining, from the source FS, meta-data for content in the directory;
         creating, using the meta-data for content in the directory, a directory entry for a first file in the directory on the target FS,
         obtaining file data for the first file from the source FS;
         populating the directory entry for the first file on the target FS using the file data, wherein the directory entry for the first file is associated with a file level attribute that specifies the first file is migrated;
         creating, using the meta-data for content in the directory, a directory entry for a second file in the directory on the target FS;
         linking the directory entry for the second file to the file data and the file level attribute;
         servicing, after the linking, the first FS operation request using target FS;
         obtaining, using the meta-data for content in the directory, a first file system identification (FSID)—file identification (FID) pair for a third file;
         locating, using the first FSID-FID pair, a source file entry in a link directory, wherein the link directory is located in the target FS;
         obtaining a path to the third file on the source FS from the source file entry;
         obtaining, using the path, a second FSID-FID pair for the third file;
         making a third determination that the first FSID-FID pair is not equal to the second FSID-FID pair;
         in response to the third determination:
            obtaining file data for the third file from the source FS;
            populating a directory entry for the third file on the target FS using the file data for the third file; and
            updating, after the populating the directory entry for the third file, a file level attribute for the third file to indicate that the third file on the target FS is migrated.

11. The computer system of claim 10, wherein the method further comprises:
   creating a link entry in the target FS, wherein the link entry comprises a file system identification (FSID) for the source FS, a file identification (FID) for the first file, and a link from the link entry to the file data.

12. The computer system of claim 10, wherein the method further comprises:
   creating a source file entry in the target FS, wherein the source file entry comprises a file system identification (FSID) for the source FS, a file identification (FID) for the first file, and a path of the first file on the source FS.

13. The computer system of claim 10, wherein the method further comprises:
   prior to receiving the first FS operation request for the target FS:
      disconnecting the client from the source FS;
      setting the source FS to read-only;
      creating the target FS;
      granting a target system comprising the target FS access to the source FS; and
      directing the client to issue the first FS operation request to the target FS.

14. The computer system of claim 10, wherein the method further comprises:
   receiving a second file system (FS) operation request for the target FS from the client;
   making a fourth determination that migration for the source FS is not complete;
   making a fifth determination that the second FS operation request specifies a third file and that a file level attribute for the third file in the directory on the target FS specifies that the third file on the target FS is un-migrated;
   in response to the fourth and fifth determination:
      obtaining file data for the third file from the source FS;
      populating a directory entry for the third file on the target FS using the file data for the third file; and
      servicing, after the populating, the second FS operation request using target FS.

15. The computer system of claim 14, wherein the method further comprises:
   updating, after the populating the directory entry for the third file, the file level attribute for the third file to indicate that the third file on the target FS is migrated.

16. The computer system of claim 15, wherein the method further comprises:
   receiving a third file system (FS) operation request for the target FS from the client, wherein the second FS operation request is a read request;
   making a sixth determination that migration for the source FS is not complete;
   making a seventh determination that the third FS operation request specifies the third file and that the file level attribute for the third file on the target FS specifies that the third file on the target FS is migrated;
   in response to the sixth and seventh determination:
      servicing the third FS operation request using target FS.

17. The computer system of claim 10, wherein the file level attribute is implemented as an extended attribute of the target FS.

* * * * *

UNITED STATES PATENT AND TRADEMARK OFFICE
CERTIFICATE OF CORRECTION

PATENT NO. : 8,332,351 B2
APPLICATION NO. : 12/714061
DATED : December 11, 2012
INVENTOR(S) : Leventhal et al.

It is certified that error appears in the above-identified patent and that said Letters Patent is hereby corrected as shown below:

In column 9, line 62, delete "Steps316," and insert -- Steps 316, --, therefor.

Signed and Sealed this
Twelfth Day of March, 2013

Teresa Stanek Rea
*Acting Director of the United States Patent and Trademark Office*